Feb. 18, 1964 P. J. REED 3,121,560
RESILIENT SUSPENSION FOR VEHICLES
Filed Dec. 8, 1960 3 Sheets-Sheet 1
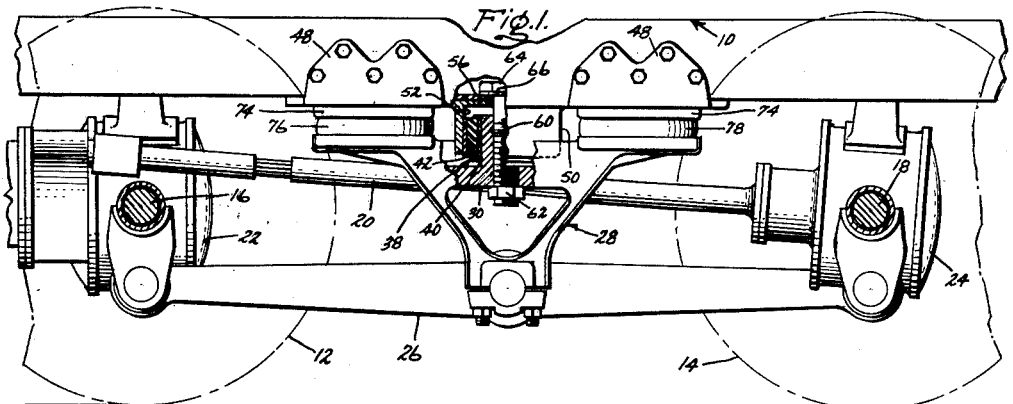
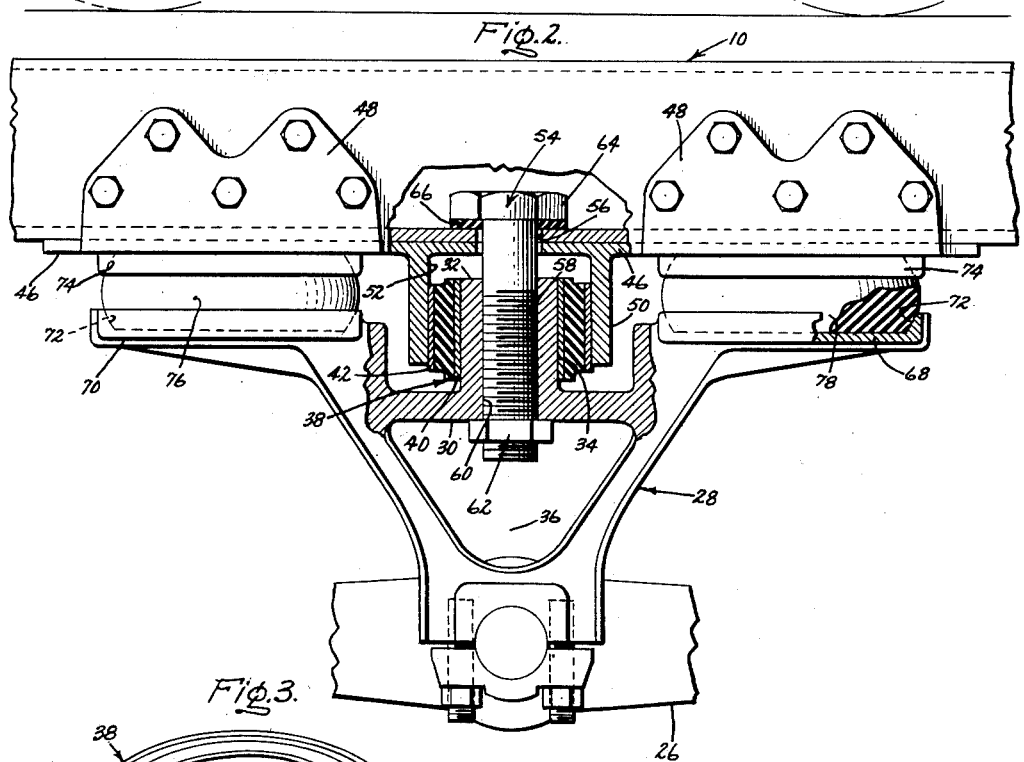
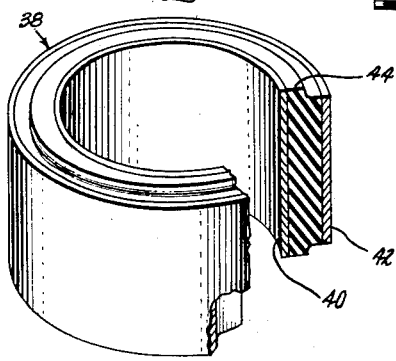
Inventor:
Paul J. Reed,
by Just & Orish
Attorneys.

Feb. 18, 1964 P. J. REED 3,121,560
RESILIENT SUSPENSION FOR VEHICLES
Filed Dec. 8, 1960 3 Sheets-Sheet 2

INVENTOR.
PAUL J. REED
BY *Gust & Irish*
ATTORNEYS

Feb. 18, 1964  P. J. REED  3,121,560
RESILIENT SUSPENSION FOR VEHICLES
Filed Dec. 8, 1960  3 Sheets-Sheet 3
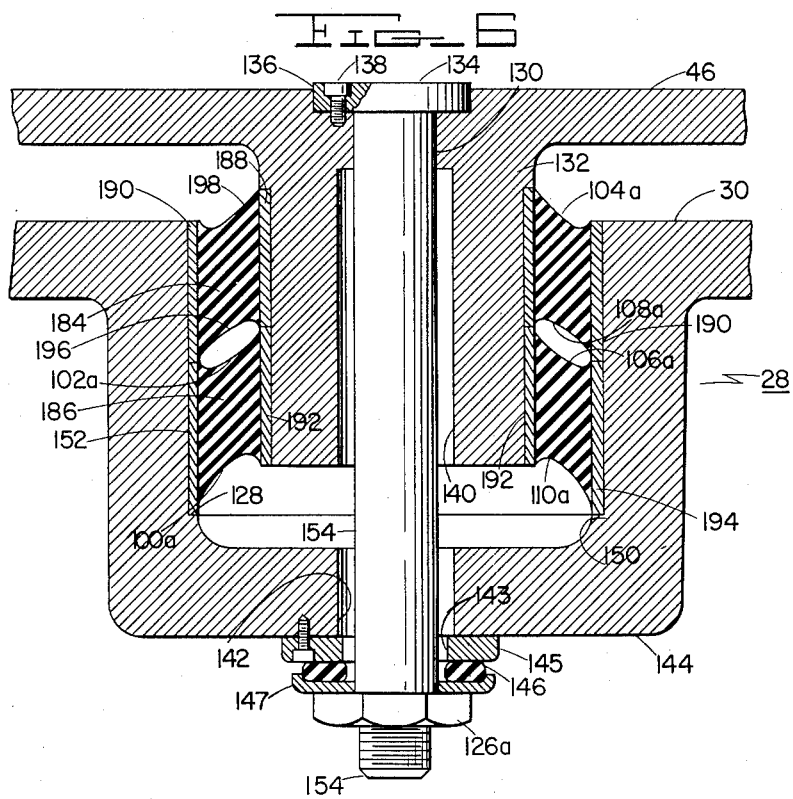
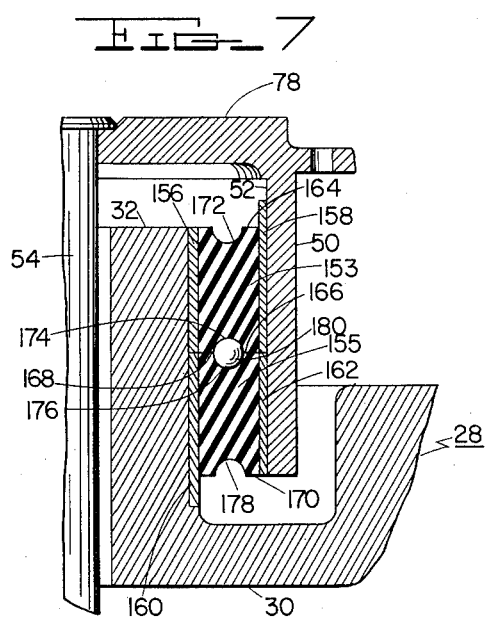
INVENTOR.
PAUL J. REED
BY Gust & Irish
ATTORNEYS

United States Patent Office 3,121,560
Patented Feb. 18, 1964

1

3,121,560
RESILIENT SUSPENSION FOR VEHICLES
Paul J. Reed, 19 E. Main St., Wabash, Ind.
Filed Dec. 8, 1960, Ser. No. 75,077
22 Claims. (Cl. 267—21)

The present invention relates to a resilient suspension for vehicles, and more particularly to a resilient suspension which utilizes rubber-like cushions instead of steel springs between the vehicle frame and axle supports. This application is a continuation-in-part of my application Serial No. 845,978 filed October 12, 1959 (now abandoned), entitled "Resilient Suspension for Vehicles."

In previously proposed resilient suspensions which used rubber-like cushions instead of steel springs, such as the resilient suspension disclosed in Patent No. 2,689,136, a plurality of fixed pins were used to transmit the driving and braking forces from the vehicle wheels and axles to the vehicle frame, these pins being connected between the vehicle frame and axle-supporting structure in such a manner as to permit relative vertical movement between the pins and the vehicle frame. Associated with each of the plurality of pins is a rubber load ring adapted to transmit such driving and braking forces between the load pins and vehicle frame. By reason of the fact that it was necessary to use a plurality of such pins, the resulting construction was relatively complex, costly to produce, and relatively costly to service.

It is an object of this invention to provide a new and improved resilient suspension for vehicles which is reliable in operation, durable in use and ecomonical to produce.

It is another object of this invention to provide an improved and simplified resilient suspension for vehicles wherein rubber-like cushions absorb vertical loads and a driving connection transmits braking and driving forces between the wheel and axle assembly and the vehicle frame, the driving connection utilizing a rubber-like assembly which accommodates vertical movement of said wheels with respect to said frame simultaneously with the transmission of said braking and driving forces.

It is still another object of this invention to provide a resilient suspension for vehicles wherein the driving connection between the vehicle frame and axles is transmitted via a single rubber-like load ring adapted to accommodate both vertical and lateral deflection of the axle assembly with respect to the vehicle frame.

Other objects will become apparent as the description proceeds.

To the accomplishment of the above and related objects, the invention may be embodied in the forms illustrated in the accompanying drawings, attention being called to the fact, however, that the drawings are illustrative only and that specific change may be made in the specific constructions illustrated and described, so long as the scope of the appended claims is not violated.

In the drawings:

FIG. 1 is a side elevation, partially broken away in section for clarity, of one embodiment of this invention;

FIG. 2 is an enlarged view similar to FIG. 1 but with additional portions of the structure broken away and sectioned;

FIG. 3 is a perspective illustration, partially sectioned, of the load ring used in the construction of FIGS. 1 and 2;

2

Figure 4:
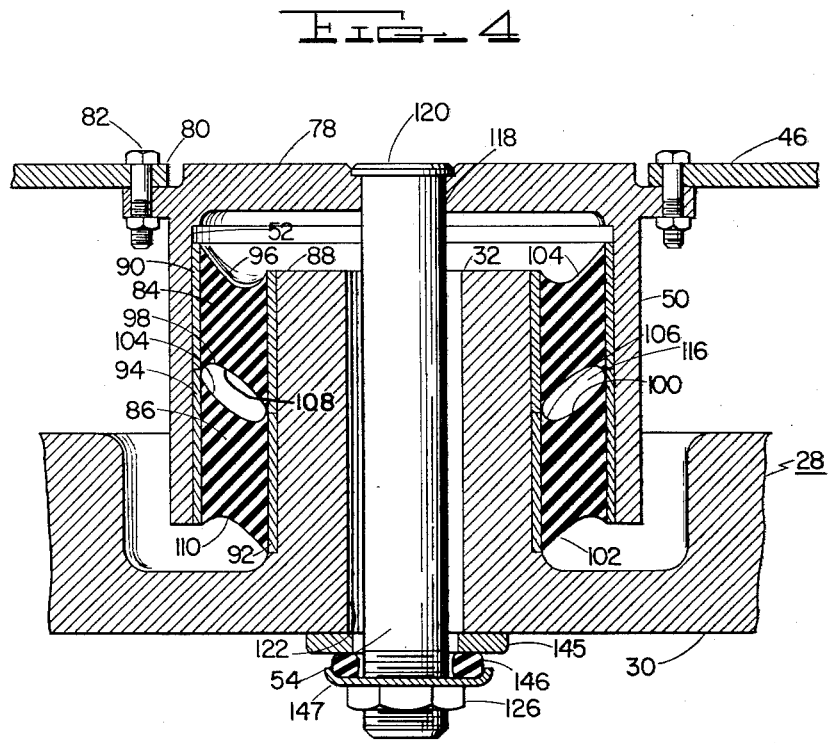
FIG. 4 is a side elevational view, partially broken away and partly in section, of another embodiment of this invention.

FIG. 6 is a side elevational view partly broken away and partly in section, showing a modification of the embodiment of FIG. 4; and FIG. 7 is a fragmentary side elevational view, partly broken away and partly in section, illustrating yet another embodiment of this invention.

Referring to the drawings, and more particularly to FIG. 1, the invention is illustrated as being used on a heavy-duty truck (not shown) having two tandem rear wheels on each side. These wheels have driving connections with the vehicle motor and further are equipped with the usual brakes. In FIG. 1, only a portion of the truck frame or chassis is illustrated, this portion being a steel channel beam indicated generally by the reference numeral 10. This beam 10, for convenience in understanding the invention, may be considered as the vehicle frame or chassis.

The truck is supported on wheels 12 and 14, shown in outline, connected to driving axles 16 and 18, respectively. These axles in turn are coupled to the usual drive shaft 20 through the usual differential gear assemblies 22 and 24, respectively. The axles 16 and 18 in turn are journaled in the opposite ends of a conventional walking beam 26 pivotally mounted intermediate the ends thereof to an axle-supporting member or saddle 28. The portion of the invention thus far described is conventional and therefore needs no further elaboration.

The saddle 28 is similar in size and construction to the saddles used in conventional suspension systems in the respect that it is relatively large and strong and is cast steel or alloy material such as aluminum or magnesium. In the central portion of the casting and formed integrally therewith is a relatively thick and strong bridge element 30, this element resembling a flat plate horizontally disposed which extends from one side of the saddle to the other. Extending upwardly from the middle section of the bridge element 30 is a driving lug or member 32 formed with a cylindrical outer surface about a vertical axis which divides the saddle 28 and the remaining construction symmetrically into left and right-hand sections, this axis being indicated by the dashed line 36.

A load ring assembly 38 of tubular or cylindrical shape as illustrated in FIG. 3 is coaxially mounted on the surface 34 of the driving lug 32. This assembly 38 is composed of inner and outer coaxial sleeves 40 and 42, respectively, which retain therebetween in snug engagement therewith a sleeve 44 of rubber like material, this material including natural rubber, neoprene, Butyl rubber and the like. Sleeve 40 is formed of steel and sleeve 42 is formed of cast iron, metal alloy, or steel coated with an anti-friction material. The inner diameter of the sleeve 40 is formed to be substantially coextensive with the diameter of the driving lug surface 34 so that when the assembly 38 is mounted on the driving lug 34 the sleeve 40 will snugly engage and be secured to the latter; this snug engagement is characterized as an interference fit which requires that the sleeve 40 be press-fitted into the driving lug 32.

Mounted on the vehicle chassis or beam 10 is a suspension frame 46 in the form of a flat plate abutted against the bottom surface of the beam 10 and having two upright, longitudinally spaced mounting brackets 48 which are bolted as shown, or riveted to the side of the beam 10. Integral with the frame 46 and depending therefrom is a sleeve or socket member 50 having a cylindrical inner surface 52 which is coaxial about the median line 36 as well as the axis of the driving lug surface 34. This socket slidably receives the outer sleeve 42 of the load ring assembly, the outer diameter of this sleeve being only slightly smaller than the diameter of the socket 52 to provide a snug but free-sliding fit between the socket member 50 and the load ring assembly 38. The socket member 50 may thus be characterized as a guide within which the load ring assembly 38 as well as the driving lug 32 may reciprocate vertically. Also, because of the rubber-like sleeve 38 the driving lug 32 (and with it the saddle 28) may deflect laterally in any given horizontal direction about the previously defined vertical axis 36. This lateral deflection when rotated through a complete revolution of 360° with respect to the socket member 50 defines a cone of movement, the driving lug 32, the rubber-like sleeve 38 and the socket member 50 being so designed and dimensioned to permit a deflection of the saddle member 28 with respect to the frame 46 of an angle of 15°, this angle being measured between the vertical axis 36 and this same axis when the saddle is laterally deflected to its maximum limit.

The reciprocal movement of the driving lug 32 inside of the socket member 50 is accommodated by the space between the uppermost end of the lug 32 and the underside of the suspension frame 46.

A rebound bolt 54 passes through a clearance opening 56 in the beam 10 and frame 46, through another opening 58 in the driving lug 32, and, lastly, through another opening 60 in the bridge element 30 to receive on its lower end a nut 62 which abuts against the lower side of the bridge element 30. The upper end of the bolt is provided with a head 64 which is separated from the beam 10 by means of a rubber-like washer 66. This bolt 54 serves only the purpose of limiting the vertical separation of the saddle with respect to the chassis frame 10 and is not utilized to transmit any driving forces from the saddle to the chassis frame.

While this bolt 54 is illustrated as being positioned in the central portion of the saddle 28, other positions may be used such as at the opposite ends of the saddle 28 or, in the alternative, may be eliminated entirely and brackets shaped around the beam 10 and fastened to the frame 46 for hanging or suspending the saddle from the beam 10 may be used to prevent complete separation of the saddle from the chassis.

The saddle 28 is further provided with two horizontally disposed and oppositely extending, flat platforms 68 and 70, respectively, these platforms lying substantially in the same plane which intersects substantially the midpoint of the axial dimension of the load ring assembly 38. On these platforms 68 and 70 are two relatively large sockets 72 which are situated directly beneath two companion sockets 74 on the suspension frame 46. Mounted in these socket pairs 72, 74 are two load cushions 76 and 78, these cushions being formed of rubber-like material. In the drawings, these cushions 76 and 78 are illustrated as being compressed under the weight of the complete vehicle, less payload. When the vehicle is loaded, these cushions 76, 78 will compress further.

In operation, the load cushions 76 and 78 absorb the vertical shock and movement between the vehicle chassis and the wheels and axles, these cushions serving the same purpose as the usual vehicle leaf springs. As driving force is applied to the wheels 12 and 14, this force is transmitted through the walking beam 26 to the saddle 28. From the saddle, the force is transmitted through the bridge element 30, the driving lug 32, the load ring assembly 38, the socket member 50, and to the vehicle chassis 10. As the wheels roll over irregular terrain, the saddle 28 obviously will tend to move vertically. In order to render the load cushions 76 and 78 effective, it then becomes necessary that the driving connection afforded by the load ring 38 accommodate this vertical motion while still being capable of transmitting the driving force of the wheels to the chassis. This vertical motion is accomplished by virture of the sliding fit between the outer ring 42 of the load ring assembly 38 and the socket member surface 52; thus, regardless of the relative vertical position between the load ring assembly and the socket member 50, the parts will still provide a driving connection between the wheels and the vehicle chassis.

Braking forces are transmitted from the wheels to the chassis in the same manner. Also, lateral forces applied to the wheels are accommodated by the load ring assembly 38 since the latter contains as an element thereof the rubber-like sleeve 44, this sleeve 44 permitting sidewise or tilting movement of the saddle 28 with respect to the chassis frame.

It will be observed that in the embodiments of FIGS. 1 through 3 inclusive, the load ring assembly 38 will deflect conically and radially to accommodate sidewise and/or tilting movement of the saddle 28 with respect to the chassis 10, however, that vertical movement of the saddle 28 with respect to the chassis 10 is accommodated by the sliding action of outer ring 42 of the load ring assembly 38 in the socket member surface 52. This sliding motion of the outer ring 42 within the socket surface 52 requires lubrication of the socket and thus it may be desirable to provide an arrangement in which at least some of the vertical movement of the saddle 28 with respect to the frame or chassis 10 is accommodated by deflection of the sleeve 44 of rubber-like material.

Referring now to FIG. 4, in which like elements are indicated by like reference numerals, driving lug 32 again extends upwardly from the middle section of the bridge element 30 of saddle 28 and has a cylindrical outer surface about a vertical axis. Socket member 50 is provided having a cylindrical inner surface 52, socket member 50 depending from a member 78 secured within an opening 80 in frame 46 by bolts 82 as shown. It will be seen that the cylindrical inner surface 52 of the socket member 50 is coaxial with the cylindrical outer surface of driving lug 32 and is radially spaced therefrom.

A pair of sleeves 84 and 86 of resilient rubber-like material are provided disposed in vertical alignment, one above the other, in the annular space between driving lug 32 and cylindrical inner surface 52 of socket 50. Sleeve 84 is respectively secured to and retained between inner and outer coaxial metal sleeves 88 and 90, and sleeve 86 is respectively secured to and retained between coaxial inner and outer metal sleeves 92 and 94. Inner sleeves 88 and 92 may be formed of steel and outer sleeves 90 and 94 may be formed of cast iron, metal alloy or other metal having bearing qualities. In the embodiment shown, inner sleeves 88 and 92 have a press fit on the outer cylindrical surface of driving lug 32 and are abutting, and the outer metal sleeves 90 and 94 are likewise in abutment and are slidingly received by the inner cylindrical surface 52 of socket 50.

It will be observed that sleeves 84 and 86 of rubber-like material have a generally parallelogram-shaped cross-section with upper and lower sides 96 and 98 of the upper sleeve 84 and upper and lower sides 100 and 102 of the lower sleeve 86 respectively being relieved and inclined downwardly from outer metal sleeves 90 and 94 toward inner metal sleeves 88 and 92. Upper sides 96 and 100 of sleeves 84 and 86, however, are respectively joined to inner metal sleeves 88 and 92 by upwardly facing rounded corners 104 and 106 and the lower sides 98 and 102 of sleeves 84 and 86 are respectively joined to the outer metal sleeves 90 and 94 by downwardly facing rounded corners 108 and 110, the corners 104 and and 106 preventing the rubber-like material from tearing away from inner metal sleeves 88 and 92 and the corners 108 and 110 likewise preventing the rubber-like material from tearing away from the outer metal sleeves 90 and 94. These corners are liberally radiused and smoothly blend into or merge with the respective sleeves.

With the cross-sectional configuration of the sleeves 84 and 86 of rubber-like material as shown in FIG. 4, the sleeves 84 and 86 will deflect vertically responsive to vertical movement of saddle 28 with reference to frame 46, however the sleeves 84 and 86 offer less resistance to downward deflection of frame 46 and socket 50 with respect to saddle 28 than they do to upward movement of frame 46 and saddle 50 with reference to saddle 28.

Figure 5:
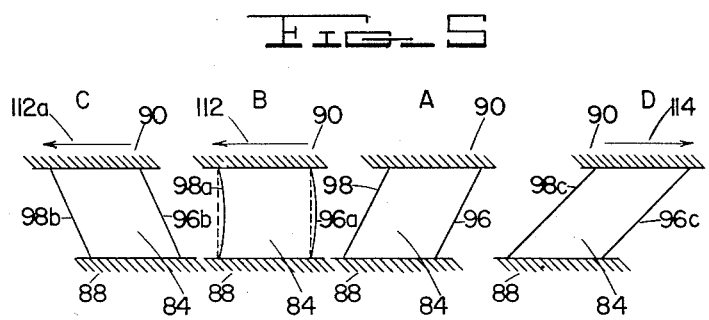
FIG. 5 is a schematic illustration useful in explaining the operation of the embodiment of the FIG. 4.

Referring now to FIG. 5A, sleeve 84 is shown schematically in its normal position retained between inner and outer metal sleeve members 88 and 90. Referring now to FIG. 5B, it will be seen that when the outer metal sleeve 90 is moved in the direction shown by the arrow 112, which corresponds to downward movement of socket 50 with reference to saddle 28 in FIG. 4, the radial distance between outer metal sleeve 90 and inner sleeve metal sleeve member 88 remains unchanged, and since the volume of sleeve 84 of rubber-like material must remain constant, top and bottom sides 96 and 98 will be deflected as shown at 96a and 98a in FIG. 5B, the sleeve 84 being placed in tension by movement of outer metal sleeve 90 in the direction 112 from the position shown in FIG. 5A to the position shown in FIG. 5B. Further movement of the outer metal sleeve 90 in the direction 112a as shown in FIG. 5C will eventually deflect sleeve 84 in tension until sides 96 and 98 assume the positions shown at 96b and 98b respectively in FIG. 5C, it being observed, however, that the sides 96 and 98 have not been stretched or elongated during deflection of the sleeve 84 from the position shown in FIG. 5A to the position shown in FIG. 5C, the only force required to deflect sleeve 84 from the position shown in FIG. 5A through the position shown in FIG. 5B to the position shown in FIG. 5C being that required to overcome the internal friction of sleeve 84 and to deflect it in tension.

Referring now to FIG. 5D, it will be seen that when outer metal sleeve 90 is moved in the direction shown by arrow 114, which corresponds to upward movement of socket 50 with respect to saddle 28, outer and inner metal sleeves 90 and 88 are still separated by the same radial distance and sleeve 84 must still occupy the same volume; however, sides 96 and 98 must now be stretched or elongated as indicated at 96c and 98c respectively and the sleeve 84 is placed in compression. Thus, it will be seen that more force is required to move outer metal sleeve 90 upwardly as shown by the arrow 114, thus deflecting the sleeve 84 of rubber-like material upwardly as shown in FIG. 5B, than is required to deflect sleeve 84 downwardly in the direction shown by the arrow 112 from the position shown in FIG. 5A to the position shown in FIG. 5C. Thus, the sleeves 84 and 86 of rubber-like material function as springs to accommodate downward movement of socket 50 and frame 46 from the normal position shown in FIG. 4 toward saddle 28, however, sleeves 84 and 86 function in the nature of shock absorbers when socket 50 and frame 46 tend to move upwardly from the position shown in FIG. 4 away from saddle 28, thus providing a snubbing action to dampen any tendency for oscillation of frame 46 with reference to saddle 28.

In addition to the vertical deflection of sleeves 84 and 86 of rubber-like material provided by the configuration shown in FIG. 4, the sliding fit between outer metal sleeves 90 and 94 and inner cylindrical surface 52 of socket 50 permits further sliding movement of outer metal sleeves 90 and 94 within inner cylindrical surface 52 and socket 50 following initial deflection of sleeves 84 and 86, dependent upon the stiffness of the rubber-like material employed.

While as shown in FIG. 4 two sleeve members 84 and 86 with their respective inner and outer metal sleeves 88 and 90 and 92 and 94 are shown with the bottom side 98 of sleeve 84 and the top side 100 of sleeve 86 defining an annular opening 116 therebetween, it will be readily seen that a single sleeve of rubber-like material between inner and outer metal sleeves may be provided, such a single sleeve of rubber-like material having the same cross-sectional configuration as the sleeves 84 and 86.

In the embodiment of FIG. 4, rebound bolt 54 extends downwardly through opening 118 in member 78 with its head 120 suitably countersunk therein, as shown, and further depends downwardly through a clearance opening 122 coaxial with driving lug 32. Rebound bolt 120 has a steel washer 147 and rubber washer 146 retained thereon by a suitable nut 126 in order to limit upward movement of socket 50 and frame 46 with respect to saddle 28. This particular rebound structure is further described hereafter in connection with FIG. 6.

Referring now to FIG. 6, in which like elements are still indicated by like reference numerals, it will be seen that the socket member may be mounted on the saddle and the driving lug on the frame, and thus, driving lug 132 depends from frame 46 and is received within socket 150 formed on bridge element 30 of saddle 28, the outer cylindrical surface of driving lug 132 being coaxial with and radially spaced inwardly from the inner cylindrical surface 152 of socket 150. With this arrangement, the sleeves 84 and 86 of rubber-like material of FIG. 4 are in essence respectively turned upside-down so that the sides 196 and 198 of sleeves 184 and sides 100a and 102a of sleeve 186 are inclined downwardly from driving lug 132 toward socket 150, as shown in FIG. 6. The corners 104a, 106a, 108a and 110a are smoothly rounded as are the corresponding corners 104, 106, 108 and 110 of FIG. 4 for the same reasons. In FIG. 6, the inner metal sleeves 188 and 192 are slidably and coaxially retained on and in engagement with the outer cylindrical surface of driving lug 132. It will be observed that in common with the embodiment of FIG. 4, the outer metal sleeves 190 and 194 have a sliding engagement with the inner cylindrical surface 152 of socket 150 and seat against an annular shoulder 128 machined in the socket 150.

In the embodiment of FIG. 6, rebound bolt 154 extends downwardly through opening 130 in the frame 46 with its head 134 secured in recess 136 by means of suitable screws 138, and through clearance opening 140 in driving lug 132. Rebound bolt 54 then depends downwardly through clearance opening 142 in the end 144 of socket 150 and through another clearance opening 143 in a steel annular plate 145 secured to the underside of socket 150. A rubber washer 146 surrounds bolt 154 and is retained by a retaining washer 147 for engagement with plate 145. The washers 146, 147 and nut 126a limit the upward movement of frame 46 and driving lug 132 from the position shown in FIG. 6 away from saddle 28.

When the socket member 150 is formed of aluminum, the steel plate 145 serves as a buffer between the socket member and the rubber washer 146. This serves in distributing the force of rebound impact over a relatively large annular area on the bottom of the socket member, thereby reducing the tendency to fracture the latter.

The clearance openings 142 and 143 are large enough to permit some tilting movement of the rebound bolt 154 with respect to socket member 150 whereby the conical movement already described may be realized.

Referring now to FIG. 7, in which like elements are still indicated by like reference numerals, socket member 50 again depends from member 78 and has a cylindrical inner surface 52 and driving lug 32 and driving lug 32 extends coaxially upwardly within socket 50, being radially spaced from cylindrical inner surface 52. A pair of vertically aligned sleeves 153 and 155 of rubber-like material are provided respectively secured to and retained between inner and outer metal sleeves 156 and 128 and 160 and 162. Inner metal sleeves 156 and 160 are abutting and have a press fit on the outer cylindrical surface of driving lug 32, and the outer metal sleeves 158 and 162 are likewise abutting and have a sliding engagement with the inner cylindrical surface 52 of the socket 50. In the embodiment of FIG. 7, the upper and lower sides 164 and 155 of the upper sleeve 152 and the upper and lower sides 158 and 170 of the lower sleeve 154 have generally semi-circular annular relieved portions 172, 174, 176 and 178 formed therein in order to permit the sleeves 152 and 154 of rubber-like material to deflect vertically in tension; it will be observed that the semi-circular relieved portions 174 and 176 in the bottom side 166 and top side 168 of the sleeves 152 and 154 respectively define a generally circular annular opening 180. Again, by virtue of the sliding fit provided between the outer metal sleeves 158 and 162 and inner cylindrical surface 52 of socket 50, further vertical movement of socket 50 with respect to saddle 28 is permitted following a given deflection of sleeves 152 and 154.

It will be observed that in the embodiment of FIGS. 4 and 7, the sleeves of rubber-like material will deflect vertically in tension upon downward movement of the frame with reference to the saddle a given amount before sliding of the outer metal sleeve with respect to the socket occurs. This initial deflection of the sleeves of rubber-like material substantially eliminates the need for continuous and generous lubrication of the inner cylindrical surface of socket member 50 as is the case in the embodiment of FIGS. 1 through 3 inclusive. Further, it will be observed that in the embodiments of FIGS. 4, 6 and 7, the sleeves of rubber-like material not only deflect conically and axially as in the embodiment of FIGS. 1 through 3 inclusive, but also vertically, thereby enhancing the riding qualities of the vehicle and tending substantially to reduce wear of the socket member.

With respect to FIG. 6, there can be no downward movement of the sleeves 190 and 194 in the socket 150 because of engagement with the annular shoulder 128. The rubber sleeves 184 and 186 are of such size as to deflect downwardly a small amount when loaded by an empty truck chassis, a conventional deflection being one-eighth (⅛th) inch for a two and one-half (2½) ton truck. The sleeves 184 and 186 thereby not only serve in a driving capacity but also as a resilient suspension since additional load will produce additional deflection. The pay load should not, of course, exceed the deflection limit of the sleeves 184 and 186 such that the latter are always free to flex vertically while simultaneously serving as a driving medium.

The arrangement of FIG. 6 may be modified to the extent of lowering the shoulder 128 from the lower end of bushing 194 whereby the latter, under certain conditions, could slide downwardly a limited amount.

It will be apparent from the foregoing that the present invention constitutes a complete suspension system wherein driving and braking forces may be transmitted to the vehicle chassis while simultaneously permitting the absorption of road shock.

While I have described above the principles of my invention in connection with specific apparatus, it is to be clearly understood that this description is made only by way of example and not as a limitation to the scope of my invention.

What is claimed is:

1. A resilient suspension for a vehicle comprising a frame and an axle-supporting member, a driving connection connecting said axle supporting member to said frame; said driving connection comprising first and second complementary elements, one element affixed to said frame, the other element affixed to said axle-supporting member, said first element including a socket and said second element including a rigid projection movably received by said socket, a sleeve of rubber-like material between said socket and said projection for transmitting driving forces therebetween and for providing limited tilting movement therebetween, said sleeve of rubber-like material being retained between two coaxial metal sleeves, one metal sleeve secured on said projection, the other metal sleeve slidably engaging said socket for axial movement; means suspending said axle-supporting member from said frame; said axle-supporting member having two oppositely extending socket elements on opposite sides, respectively, of said driving connection, said socket elements being spaced from and juxtaposed with respect to said frame, and two rubber-like cushions in said socket elements, respectively, engaging said frame in load-supporting relation.

2. A resilient suspension for a vehicle comprising a frame and a saddle, a driving connection connecting said frame to said saddle; said driving connection comprising a socket element depending from said frame, said socket element having a cylindrically shaped inner surface coaxially surrounding a vertically disposed axis, a driving member on said saddle having a cylindrical outer surface of a diameter smaller than said socket surface, said driving member being coaxially received within said socket, said socket surface being radially spaced from said driving member surface, a sleeve of rubber-like material, said sleeve being retained between two coaxial inner and outer metal sleeves, said inner metal sleeve being press-fitted onto said driving member surface, said outer metal sleeve slidably engaging said socket surface for permitting vertical movement therebetween; said saddle having two oppositely extending platforms on opposite sides, respectively, of said driving connection, said platforms being spaced from and juxtaposed with respect to said frame, and two rubber-like cushions interposed in load-supporting relation between said platforms, respectively, and said frame.

3. A resilient suspension for a vehicle comprising a frame and a saddle, a driving connection connecting said frame to said saddle; said driving connection comprising a socket element depending from said frame, said socket element having a cylindrically shaped inner surface coaxially surrounding a vertically disposed axis, said saddle being an integral casting having a horizontally disposed bridge element therein, said bridge element having an upstanding driving member thereon, said driving member having a cylindrical outer surface of a diameter smaller than said socket surface, said driving member being coaxially received within said socket, said socket surface being radially spaced from said driving member surface, a sleeve of rubber-like material, said sleeve being retained between two coaxial inner and outer metal sleeves, said inner metal sleeve being press-fitted onto said driving member surface, said outer metal sleeve slidably engaging said socket surface for permitting vertical movement therebetween, a rebound bolt passing through a clearance opening in said frame and depending through an opening in said driving member and said bridge element, said openings being coaxial with said socket cylindrical surface; and means spaced from said driving connection resiliently mounting said frame on said saddle.

4. A resilient suspension for a vehicle comprising a frame and a saddle, a driving connection connecting said frame to said saddle; said driving connection comprising a socket element depending from said frame, said socket element having a cylindrically shaped inner surface coaxially surrounding a vertically disposed axis, said saddle being an integral casting having a horizontally disposed bridge element therein, said bridge element having an upstanding driving member thereon, said driving member having a cylindrical outer surface of a diameter smaller than said socket surface, said driving member being coaxially received within said socket, said socket surface being radially spaced from said driving member surface, a sleeve of rubber-like material, said sleeve being retained between two coaxial inner and outer metal sleeves, said inner metal sleeve being press-fitted onto said driving member surface, said outer metal sleeve slidably engaging said socket surface for permitting vertical movement therebetween, a rebound bolt passing through a clearance opening in said frame and depending through an opening in said driving member and said bridge element to receive a nut on the lower extremity, said openings being coaxial with said socket cylindrical surface; said saddle having two oppositely extending platforms thereon on opposite sides, respectively, of said driving connection, said platforms lying in a common plane which intersects substantially the axial midpoint of said sleeve of rubber-like material, and two rubber-like cushions positioned on said two platforms, respectively, and engageable with said frame in load-transferring relationship.

5. A resilient suspension for a vehicle comprising a frame and a saddle, a driving connection connecting said frame to said saddle; said driving connection comprising a socket element depending from said frame, said socket element having a cylindrically shaped inner surface coaxially surrounding a vertically disposed axis, said saddle being an integral casting having a horizontally disposed bridge element thereon, said bridge element having an upstanding driving member thereon, said driving member having a cylindrical outer surface of a diameter smaller than said socket surface, said driving member being coaxially received within said socket, said socket surface being radially spaced from said driving member surface, a sleeve of rubber-like material, said sleeve being retained between two coaxial inner and outer metal sleeves, said inner metal sleeve being press-fitted onto said driving member surface, said outer metal sleeve slidably engaging said socket surface for permitting vertical movement therebetween, the upper ends of said metal-rubber sleeve assembly and said driving member being spaced from the upper end of said socket thereby providing for relative vertical movement between said saddle and said frame; and means spaced from said driving connection resiliently mounting said frame on said saddle.

6. A resilient suspension for a vehicle comprising a frame and saddle, a pair of spaced apart oppositely extending socket elements on said saddle, said socket elements being spaced beneath and juxtaposed with respect to said frame, two rubber-like cushions in said socket elements, respectively, engaging said frame in load-supporting relation; a driving connection disposed between said socket elements and connecting said frame to said saddle, said driving connection including an upstanding member on said saddle spaced horizontally from and juxtaposed with respect to a depending member on said frame, a rubber-like material interposed between said upstanding and depending members for transmitting driving and braking forces therebetween, and rebound connection means for securing said frame and saddle in assembly but permitting limited relative vertical movement thereof.

7. A resilient suspension for a vehicle comprising a frame and saddle, a pair of spaced apart oppositely extending platforms on said saddle, said platforms being horizontally spaced apart and juxtaposed beneath said frame, two rubber-like cushions on said platforms, respectively, engaging said frame in load-supporting position, a horizontally extending bridge element on said saddle extending between said platforms in force-transmitting relationship, said bridge element being disposed beneath said frame, a driving connection disposed between said socket elements and connecting said frame to said saddle, said driving connection including an upstanding member on said saddle spaced horizontally from and juxtaposed with respect to a depending member on said frame, rubber-like material interposed between said upstanding and depending members for transmitting driving and braking forces therebetween, and a rebound bolt interconnecting said frame and bridge element for holding said frame and saddle in assembly.

8. A resilient suspension for a vehicle comprising a frame and saddle, a pair of spaced apart oppositely extending platforms on said saddle, said platforms being horizontally spaced apart and juxtaposed beneath said frame, two rubber-like cushions on said platforms, respectively, engaging said frame in load-supporting position, a horizontally extending bridge element on said saddle extending between said platforms in force-transmitting relationship, said bridge element being disposed beneath said frame, a driving connection disposed between said socket elements and connecting said frame to said saddle, said driving connection including an upstanding member on said saddle spaced horizontally from and juxtaposed with respect to a depending member on said frame, rubber-like material interposed between said upstanding and depending members for transmitting driving and braking forces therebetween, and rebound connection means for securing said frame and saddle in assembly but permitting limited relative vertical movement thereof.

9. A resilient suspension for a vehicle comprising a frame and an axle-supporting member, a driving connection connecting said axle supporting member to said frame; said driving connection comprised of first and second complementary elements, one element affixed to said frame, the other element affixed to said axle-supporting member, said first element including a socket and said second element including a rigid projection movably received by said socket, a sleeve of rubber-like material between said socket and said projection for transmitting driving forces therebetween and for providing limited tilting movement therebetween, said sleeve of rubber-like material being retained between two coaxial metal sleeves, one metal sleeve engaging said projection and the other engaging said socket; means suspending said axle-supporting member from said frame; said axle-supporting member having two opposite extending socket elements on opposite sides, respectively, of said driving connection, said socket elements being spaced from and juxtaposed with respect to said frame, and two rubber-like cushions in said socket elements, respectively, engaging said frame in load-supporting relation.

10. A resilient suspension for a vehicle comprising a frame and an axle-supporting member, a driving connection connecting said axle supporting member to said frame; said driving connection comprising first and second complementary elements, one element affixed to said frame, the other element affixed to said axle-supporting member, said first element including a socket and said second element including a rigid projection movably received by said socket, a sleeve of rubber-like material between said socket and said projection for transmitting driving forces therebetween and for providing limited tilting movement therebetween; means suspending said axle-supporting member from said frame; said axle-supporting member having two opposite extending socket elements on opposite sides, respectively, of said driving connection, said socket elements being spaced from and juxtaposed with respect to said frame, and two rubber-like cushions in said socket elements, respectively engaging said frame in load-supporting relation.

11. A resilient suspension for a vehicle comprising a frame and an axle-supporting member, a driving connection connecting said axle supporting member to said frame; said driving connection comprising first and second complementary elements, one element affixed to said frame, the other element affixed to said axle-supporting member, said first element including a socket and said second element including a rigid projection movably received by said socket, a sleeve of rubber-like material between said socket and said projection for transmitting driving forces therebetween, said sleeve of rubber-like material being retained between two coaxial metal sleeves, one metal sleeve secured on said projection, the other metal sleeve slidably engaging said socket for axial movement; and an elongated rebound member extending through a first opening in said frame and the one element fixed thereto and depending through a second opening in said axle-supporting member and the other element fixed thereto, said first and second openings being coaxial with said socket and projection, one of said first and second openings having clearance with said rebound member; and means spaced from said driving connection resiliently mounting said frame on said axle-supporting member.

12. The combination of claim 1 wherein said frame has a normal position with reference to said saddle and said rubber-like material comprises a member proportioned to offer less resistance to deflection when said frame is depressed from its normal position toward said saddle than it does when said frame is moved from its normal position away from said saddle.

13. The combination of claim 10 wherein the top and bottom sides of said sleeve of rubber-like material are normally respectively inclined downwardly from the one element which is affixed to said frame toward the other element which is affixed to said axle-supporting member whereby said sleeve of rubber-like material offers less resistance to deflection when said frame is depressed toward said axle-supporting member than when it is moved away therefrom.

14. The combination of claim 4 wherein said sleeve of rubber-like material normally has a generally parallelogram-shaped cross-section with its top and bottom sides respectively inclined downwardly from said socket element toward said upstanding member whereby said sleeve of rubber-like material offers less resistance to deflection when said frame is depressed toward said axle-supporting member than when it is moved away therefrom.

15. A resilient suspension for a vehicle comprising a frame and a saddle; a driving connection connecting said frame to said saddle, said driving connection comprising a socket element having a cylindrically shaped inner surface coaxially surrounding a vertically disposed axis, and a vertically disposed driving element having a cylindrical outer surface of a diameter smaller than said socket surface, said driving element being coaxially disposed within said socket element; said saddle being an integral casting having a horizontally disposed bridge member therein, one of said elements depending from said frame and the other being formed on said bridge member; a sleeve of rubber-like material, said sleeve being retained between coaxial inner and outer metal sleeves, said inner metal sleeve engaging and being secured on said driving element surface, said outer metal sleeve slidably engaging said socket element surface for permitting vertical movement therebetween, a rebound bolt passing through a first opening in said frame and the element thereon and depending through a second opening in said bridge member and the element thereon, said openings being coaxial with said socket and driving element surfaces, one of said openings having clearance with said rebound bolt; and means spaced from said driving connection resiliently mounting said frame on said saddle.

16. The combination of claim 15 wherein said sleeve of rubber-like material normally has a generally parallelogram-shaped cross-section with its top and bottom sides respectively inclined downwardly from the element on said frame toward the element on said saddle whereby said sleeve of rubber-like material deflects vertically but offers less resistance to deflection when said frame is depressed toward said saddle than when it is moved away therefrom, the arrangement being such that said sleeve of rubber-like material deflects before said outer metal sleeve slides in said socket element surface.

17. The combination of claim 16 wherein a second sleeve of rubber-like material is provided substantially identical to and vertically aligned with the first named sleeve of rubber-like material and retained between second coaxial inner and outer metal sleeves, said inner and outer metal sleeves of said first and second sleeves of rubber-like material respectively abutting, the bottom side of the upper sleeve of rubber-like material and the top side of the lower sleeve of rubber-like material defining one annular opening.

18. The combination of claim 1 wherein said sleeve of rubber-like material has side walls respectively engaging said metal sleeves and top and bottom walls respectively formed with a relieved portion whereby said member deflects vertically responsive to vertical movement of said frame with respect to said saddle.

19. The combination of claim 10 wherein the top and bottom sides of said sleeve of rubber-like material are respectively relieved whereby said sleeve of rubber-like material deflects vertically responsive to vertical movement of said frame with respect to said saddle.

20. The combination of claim 4 wherein the top and bottom sides of said sleeve of rubber-like material respectively have relieved portions formed therein whereby said sleeve of rubber-like material deflects vertically responsive to vertical movement of said frame with respect to said axle-supporting member prior to sliding of said outer metal sleeve in said socket.

21. The combination of claim 15 wherein the top and bottom sides of said sleeve of rubber-like material respectively have annular relieved portions of generally semi-circular cross-section formed therein whereby said sleeve of rubber-like material deflects vertically responsive to vertical movement of said frame with respect to said saddle prior to sliding of said outer metal sleeve in said socket element surface.

22. The combination of claim 21 wherein a second sleeve of rubber-like material is provided substantially identical to and vertically aligned with the first-named sleeve of rubber-like material and retaining between second coaxial inner and outer metal sleeves, said inner and outer metal sleeves of said first and second sleeves of rubber-like material respectively abutting, the relieved portion in the bottom side of the upper sleeve of rubber-like material and the relieved portion in the top side of the lower sleeve of rubber-like material defining an annular opening of generally circular cross-section.

References Cited in the file of this patent

UNITED STATES PATENTS

| 1,396,979 | Thomas | Nov. 15, 1921 |
| 2,356,962 | Williams | Aug. 29, 1944 |
| 2,980,439 | Miller | Apr. 18, 1961 |

FOREIGN PATENTS

| 678,809 | Great Britain | Sept. 10, 1952 |